(12) United States Patent
Kasuya et al.

(10) Patent No.: US 8,376,905 B2
(45) Date of Patent: *Feb. 19, 2013

(54) VEHICLE DRIVE DEVICE

(75) Inventors: Satoru Kasuya, Hazu (JP); Mikio Iwase, Anjo (JP); Tomohide Suzuki, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 647 days.

This patent is subject to a terminal disclaimer.

(21) Appl. No.: 12/588,401

(22) Filed: Oct. 14, 2009

(65) Prior Publication Data

US 2010/0105518 A1    Apr. 29, 2010

(30) Foreign Application Priority Data

Oct. 28, 2008    (JP) .................................. 2008-277451

(51) Int. Cl.
| | |
|---|---|
| B60W 10/02 | (2006.01) |
| B60W 10/08 | (2006.01) |
| B60W 10/04 | (2006.01) |
| H02P 15/00 | (2006.01) |
| F16D 21/00 | (2006.01) |
| F16D 49/00 | (2006.01) |
| F16D 33/00 | (2006.01) |
| F16D 21/08 | (2006.01) |
| F16D 21/02 | (2006.01) |

(52) U.S. Cl. ................... 477/5; 477/6; 477/8; 192/48.1; 192/48.7; 192/48.91

(58) Field of Classification Search ................. 477/2–29; 180/65.1–65.7; 475/5; 192/48.91, 48.1, 192/48.3, 48.7
See application file for complete search history.

(56) References Cited

U.S. PATENT DOCUMENTS

| | | | | |
|---|---|---|---|---|
| 5,415,603 | A | * | 5/1995 | Tuzuki et al. ..................... 477/5 |
| 5,562,565 | A | * | 10/1996 | Moroto et al. .................... 477/3 |
| 5,789,823 | A | | 8/1998 | Sherman |

(Continued)

FOREIGN PATENT DOCUMENTS

| | | |
|---|---|---|
| JP | U 1-58853 | 4/1989 |
| JP | A-2000-110916 | 4/2000 |

(Continued)

OTHER PUBLICATIONS

International Search Report mailed Nov. 10, 2009 for National Phase Application No. PCT/JP2009/066584.

*Primary Examiner* — Tisha Lewis
(74) *Attorney, Agent, or Firm* — Oliff & Berridge, PLC (57) ABSTRACT

A vehicle drive device that includes a speed change mechanism; a fluid transmission device provided closer to an engine attachment side than the speed change mechanism is and including a lock-up clutch; an electric motor having a rotor and a stator and connecting the rotor to an input portion of the fluid transmission device; and an engine power cut-off clutch that transmits or cuts off a driving force of an engine to or from the fluid transmission device.

7 Claims, 3 Drawing Sheets

U.S. PATENT DOCUMENTS

| | | |
|---|---|---|
| 6,217,476 B1 | 4/2001 | Müller et al. |
| 6,569,048 B1 * | 5/2003 | Swales ............................. 475/33 |
| 6,599,214 B2 * | 7/2003 | Swales ............................. 475/35 |
| 6,935,450 B1 | 8/2005 | Tsuzuki et al. |
| 7,832,537 B2 * | 11/2010 | Blessing et al. ........... 192/48.91 |
| 7,953,533 B2 * | 5/2011 | Tsuda ............................. 701/51 |
| 8,123,656 B2 * | 2/2012 | Schoenek et al. .................. 477/5 |
| 2004/0045752 A1 | 3/2004 | Omote et al. |
| 2005/0150734 A1 | 7/2005 | Breier et al. |
| 2009/0054203 A1 * | 2/2009 | Heeke .............................. 477/15 |
| 2011/0086739 A1 * | 4/2011 | Kajigai et al. .................... 477/5 |

FOREIGN PATENT DOCUMENTS

| | | |
|---|---|---|
| JP | A 2000-283188 | 10/2000 |
| JP | A 2002-103998 | 4/2002 |
| JP | A 2005-521000 | 7/2005 |
| JP | B2 3864955 | 1/2007 |

* cited by examiner

VEHICLE DRIVE DEVICE

INCORPORATION BY REFERENCE

The disclosure of Japanese Patent Application No. 2008-277451 filed on Oct. 28, 2008, including the specification, drawings and abstract is incorporated herein by reference in its entirety.

BACKGROUND

The present invention generally relates to a hybrid vehicle drive device having an engine and a motor as a driving source. More particularly, the present invention relates to a vehicle drive device having an engine power cut-off clutch in a hydraulic transmission having a lock-up clutch.

A drive device for transmitting rotation generated by a driving source to a speed change mechanism through a hydraulic transmission having a lock-up clutch have been widely used as a drive device that is mounted on a hybrid vehicle. This type of drive devices has an engine power cut-off clutch for transmitting or cutting off a driving force of an engine to and from a hydraulic transmission. The lock-up clutch is an element for transmitting a driving force generated by a power source to a speed change mechanism without using a fluid, and when the vehicle speed reaches a preset value, the lock-up clutch is operated (locked up) to eliminate transmission loss, thereby improving fuel consumption.

One example of such drive devices having a hydraulic transmission with a lock-up clutch is a drive device having an engine power cut-off clutch disposed in a hydraulic transmission with a lock-up clutch (Japanese Patent Publication Application No. JP-A-2000-110916). In this drive device, a hydraulic pressure is supplied to each chamber provided between a cover of the hydraulic transmission and pistons of both clutches, and a pressure difference is generated between the chambers, whereby the engine power cut-off clutch and the lock-up clutch are operated.

SUMMARY

In the above drive device, however, operation of the engine power cut-off clutch and the lock-up clutch is controlled by the difference between the hydraulic pressures supplied to each chamber, causing a problem of poor controllability of the clutches. There are also a problem that the transfer torque capacity is relatively small since the engine power cut-off clutch and the lock-up clutch are single-plate clutches, and a problem that a large amount of heat is generated by a friction material during engagement of the clutches since the friction material area is small.

Thus, in order to improve the controllability and the transfer torque capacity of the engine power cut-off clutch and the lock-up clutch, it can be considered to switch the engine power cut-off clutch and the lock-up clutch from single-plate clutches to multi-plate clutches having a hydraulic actuator. However, merely switching both clutches from single-plate clutches to multi-plate clutches causes a new problem that the size of a hydraulic drive device is increased.

Thus, the present invention has been developed to solve the above problems, and it is an object of the present invention to provide a vehicle drive device having an engine power cut-off clutch disposed in a hydraulic transmission having a lock-up clutch, in which an increase in size of a hydraulic drive device, and thus, an increase in size of the drive device, can be suppressed while improving the controllability and the transfer torque capacity of both clutches and reducing the amount of heat generation by a friction material during engagement of the clutches.

According to a first aspect of the present invention which has been developed to solve the above problems, a vehicle drive device includes: a speed change mechanism; a fluid transmission device provided closer to an engine attachment side than the speed change mechanism is and including a lock-up clutch; an electric motor having a rotor and a stator and connecting the rotor to an input portion of the fluid transmission device; and an engine power cut-off clutch that transmits or cuts off a driving force of an engine to or from the fluid transmission device. In the vehicle drive device, the lock-up clutch includes a plurality of friction plates and a hydraulic actuator that presses the friction plates, and is disposed closer to the engine attachment side than a torus is in the fluid transmission device; the friction plates are disposed between an outer diameter portion of the torus and a front cover of the fluid transmission device; the engine power cut-off clutch includes a plurality of friction plates and a hydraulic actuator that presses the friction plates, is disposed closer to the engine attachment side than the torus is in the fluid transmission device, and is formed with a diameter smaller than an outer diameter of the lock-up clutch; and the electric motor is disposed so as to axially overlap the engine power cut-off clutch friction plates on an outer diameter side of the engine power cut-off clutch.

In this vehicle drive device, each of the lock-up clutch and the engine power cut-off clutch is formed by a multi-plate clutch, and the friction plates of each clutch are pressed by the corresponding hydraulic actuator. Thus, the lock-up clutch and the engine power cut-off clutch can be controlled independently, and the transfer torque capacity can be increased, and the amount of heat generation of a friction material during engagement of the clutches can be reduced. Thus, the controllability and the transfer torque capacity of the engine power cut-off clutch and the lock-up clutch can be improved, and the amount of heat generation can be reduced.

Moreover, in this vehicle drive device, the lock-up clutch friction plates are disposed on an outer diameter side of the torus. Thus, the lock-up clutch and the torus can be disposed close to each other. Moreover, by making the diameter of the engine power cut-off clutch smaller than that of the lock-up clutch, both clutches can be disposed close to each other in the axial direction, while assuring a required capacity of the lock-up clutch for which a larger transfer torque capacity is required than for the engine power cut-off clutch. Thus, even if the engine power cut-off clutch is provided in the fluid transmission device having the lock-up clutch, elements that are disposed in the fluid transmission device can be disposed close to each other in the axial direction. Thus, an increase in size of the fluid transmission device in the axial direction can be suppressed. As a result, an increase in size of the drive device can also be suppressed.

Moreover, in this vehicle drive device, the electric motor is disposed so as to axially overlap the engine power cut-off clutch friction plates on the outer diameter side of the engine power cut-off clutch. Thus, the fluid transmission device and the electric motor can be disposed close to each other in the axial direction, whereby an increase in size of the drive device in the axial direction can be more reliably suppressed.

Thus, according to the vehicle drive device, the engine power cut-off clutch is disposed in the hydraulic transmission having the lock-up clutch, and an increase in size of the hydraulic transmission, and thus, an increase in size of the drive device, can be suppressed while improving the controllability and the transfer torque capacity of the engine power cut-off clutch and the lock-up clutch and reducing the amount of heat generation of the friction material during engagement of the clutches.

In the above vehicle drive device, the vehicle drive device may further include a lock-up clutch clutch drum that holds the lock-up clutch friction plates, and the lock-up clutch clutch drum may be disposed so as to axially overlap a part of the torus on an outer diameter side of the torus.

With this structure, a space on the outer diameter side of the torus can be effectively used, whereby an increase in size of the fluid transmission device in the axial direction can be suppressed. As a result, an increase in size of the drive device can be suppressed.

Moreover, in the above vehicle drive device, the lock-up clutch clutch drum may include a connection member that is connected to an outer contour of a turbine runner on the outer diameter side of the torus.

With this structure, when the lock-up clutch clutch drum is connected to the turbine runner, a space on the outer diameter side of the torus can be effectively used, whereby the lock-up clutch and the torus can be disposed closer to each other in the axial direction. Thus, an increase in size of the fluid transmission device in the axial direction can further be suppressed, and an increase in size of the drive device can be more reliably suppressed.

Moreover, in the above vehicle drive device, each of the lock-up clutch actuator and the engine power cut-off clutch actuator may include a piston that presses the friction plates and a fluid-tight engagement pressure chamber to which an engagement pressure for operating the piston to engage the clutch is supplied, and at least one of the lock-up clutch actuator and the engine power cut-off clutch actuator may be disposed so that a part of the piston and the engagement pressure chamber axially overlap each other on an inner diameter side of the friction plates.

In at least one of the lock-up clutch actuator and the engine power cut-off clutch actuator, a part of the piston, and the engagement pressure chamber are disposed so as to axially overlap each other on the inner diameter side of the friction plates. Thus, the hydraulic actuator can be structured by effectively using a space on the inner diameter side of the friction plates. Therefore, an increase in axial dimension of the clutches can be suppressed, whereby an increase in size of the hydraulic transmission in the axial direction can be suppressed.

Moreover, in the above vehicle drive device, the engagement pressure chamber of the engine power cut-off clutch actuator may be formed by the engine power cut-off clutch piston and the front cover.

This structure eliminates the need for a special member to form the engagement pressure chamber of the engine power cut-off clutch actuator. Thus, the axial dimension of the engine power cut-off clutch can be reduced by the amount corresponding to the special member. Therefore, an increase in axial dimension, associated with disposing the engine power cut-off clutch in the hydraulic transmission, can be suppressed. Moreover, since no special member is required, the number of components is reduced, whereby the cost and the weight can also be reduced.

Moreover, in the above vehicle drive device, the engagement pressure chamber of the lock-up clutch actuator may be formed by the lock-up clutch piston and a turbine hub.

This structure eliminates the need for a special member to form the engagement pressure chamber of the lock-up clutch actuator. Thus, the axial dimension of the lock-up clutch can be reduced by the amount corresponding to the special member. Therefore, an increase in axial dimension, associated with disposing the engine power cut-off clutch in the hydraulic transmission, can be suppressed. Moreover, since no special member is required, the number of components is reduced, whereby the cost and the weight can also be reduced.

Moreover, in the above vehicle drive device, the lock-up clutch friction plates and the engine power cut-off clutch friction plates may be disposed so as to axially overlap each other.

This structure enables the lock-up clutch and the engine power cut-off clutch to be disposed close to each other in the axial direction in the fluid transmission device. Thus, an increase in axial dimension, associated with disposing the engine power cut-off clutch in the fluid transmission device, can be suppressed.

Moreover, in the above vehicle drive device, a lock-up clutch clutch hub may be formed by the engine power cut-off clutch clutch drum.

Forming the lock-up clutch clutch hub and the engine power cut-off clutch clutch drum by a single member in this manner enables reduction in size of the friction plates of both clutches. Therefore, an increase in size, associated with disposing the engine power cut-off clutch in the hydraulic transmission, can be suppressed. Moreover, since the number of clutch components is reduced, the cost and the weight can also be reduced.

According to the vehicle drive device of the first aspect of the present invention, as described above, in a drive device having an engine power cut-off clutch disposed in a hydraulic transmission having a lock-up clutch, an increase in size of a hydraulic drive device, and thus, an increase in size of a drive device, can be suppressed while improving the controllability and the transfer torque capacity of both clutches and reducing the amount of heat generation of a friction material during engagement of the clutches.

DETAILED DESCRIPTION OF EMBODIMENTS

Figure 1:
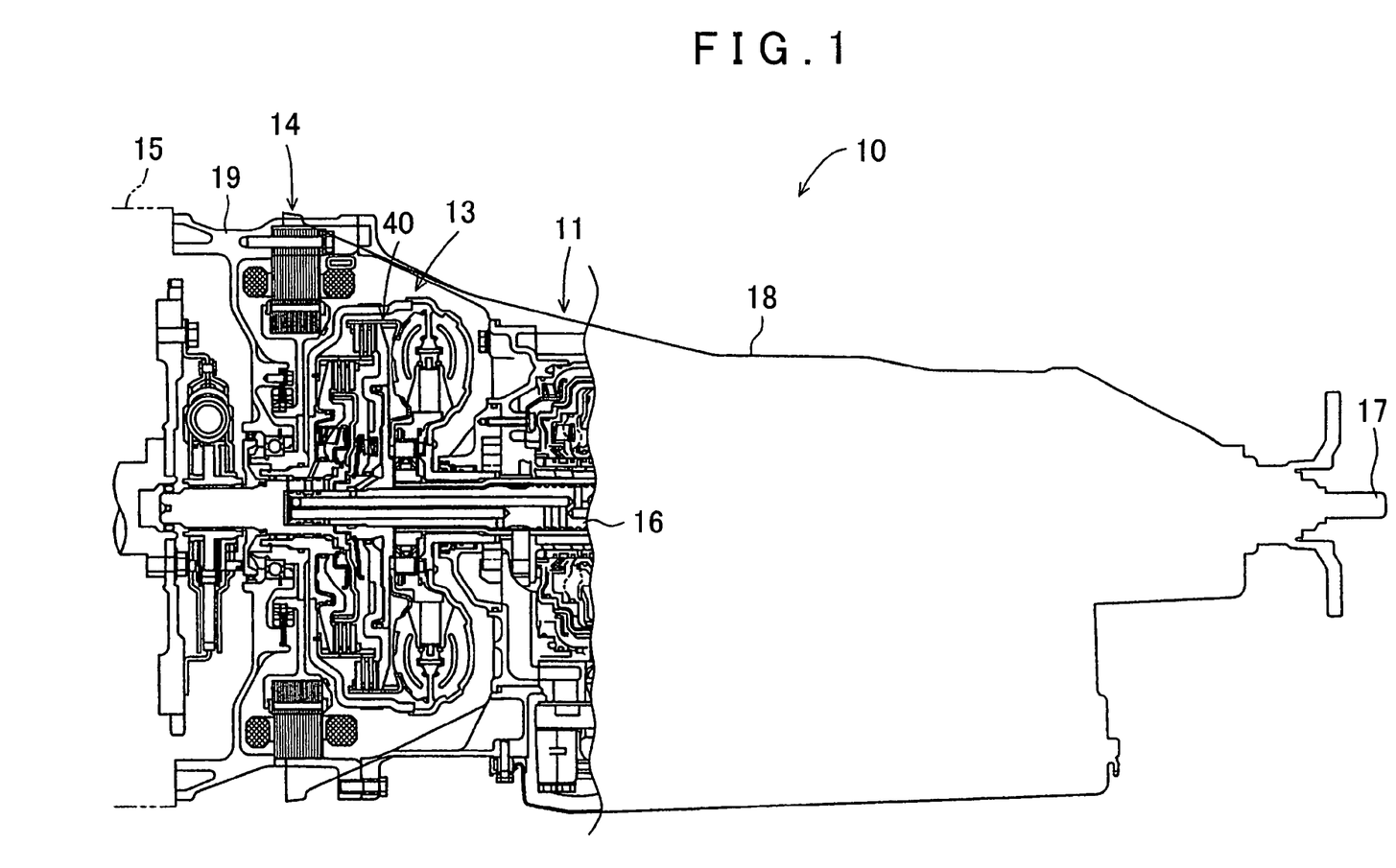
FIG. 1 is a partial cross-sectional view showing a schematic structure of a drive device according to an embodiment.
Figure 2:
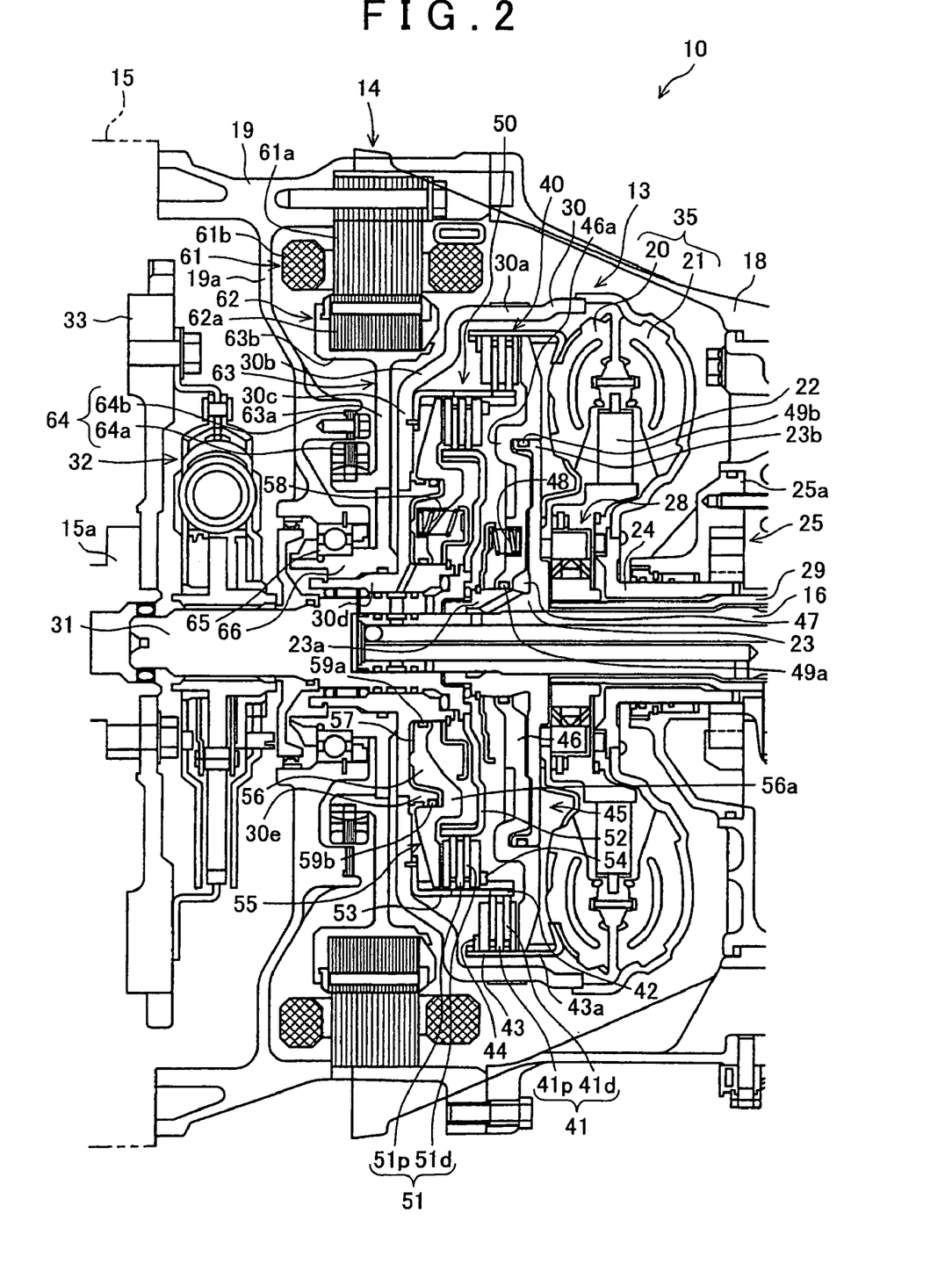
FIG. 2 is an enlarged cross-sectional view of a portion near a torque converter in the drive device according to the embodiment.

A preferred embodiment embodying a vehicle drive device of the present invention will be described in detail below with reference to the accompanying drawings. The present embodiment will be described with respect to a one-motor parallel type hybrid vehicle drive device. The drive device of the embodiment will be described with reference to FIGS. 1 and 2. FIG. 1 is a partial cross-sectional view showing a schematic structure of the drive device of the embodiment. FIG. 2 is an enlarged cross-sectional view of a portion near a torque converter in the drive device of the embodiment.

As shown in FIG. 1, a drive device 10 includes a multi-stage speed change mechanism 11 accommodated in a transmission case 18, a torque converter 13 having a lock-up clutch 40, and a motor-generator 14 formed by a brushless DC motor or the like and accommodated in a motor housing 19. Moreover, the drive device 10 is connected to an internal combustion engine 15, such as a gasoline engine, in the left part of FIG. 1 (on the side to which the engine is attached; hereinafter referred to as the "engine attachment side").

Components of this drive device 10 are arranged uniaxially, and the drive device 10 is applied to a front engine, rear drive (FR) type. More specifically, the motor-generator 14, the torque converter 13, and the speed change mechanism 11 are sequentially arranged on the same axis in this order from the engine attachment side, and rotation of an input shaft 16 is shifted in the speed change mechanism 11, and output to an output shaft 17.

As shown in FIG. 2, the torque converter 13 has a turbine runner 20, a pump impeller 21, and a stator 22, and the turbine runner 20 is connected to a turbine hub 23 that is spline-connected to the input shaft 16. Moreover, an oil pump 25 is disposed between the torque converter 13 and the speed change mechanism 11, and a pump case 25*a* is fixed to the transmission case 18.

A hub 24, which is fixed to a base of the pump impeller 21, is rotatably supported on an inner periphery of the pump case 25*a* through a needle bearing, and an oil seal is disposed between the pump case 25*a* and the hub 24. Moreover, the stator 22 is connected to a one-way clutch 28, and an inner cage of the one-way clutch 28 is fixed to the oil pump 25 through a sleeve 29 positioned between the inner shaft 16 and the hub 24.

Moreover, a front cover 30 fixed to the pump impeller 21 has an outer diameter portion 30*a* extending toward the engine (forward) in an axial direction so as to cover the lock-up clutch 40, an intermediate portion 30*b* obliquely structured so as to cover an engine power cut-off clutch 50, and an inner diameter portion 30*c* extending substantially vertically in a radial direction. A boss portion 30*d* is formed at an inner diameter end of the front cover 30, and a center piece 31 is loosely inserted in the boss portion 30*d*. Thus, the front cover 30 and the center piece 31 are rotatable relative to each other. On the other hand, a rotor hub 66, which will be described below, is spline-connected to an outer periphery of the boss portion 30*d*.

The center piece 31 extends forward (toward the engine 15) in the axial direction so as to align with the input shaft 16 and has a hollow rear end portion, and a tip portion of the input shaft 16 is disposed in the hollow portion. Thus, the center piece 31 and the input shaft 16 are rotatable relative to each other. On the other hand, the inner diameter side of a damper mechanism 32 is connected to a tip portion of the center piece 31. This damper mechanism 32 is fixed to a drive plate 33 connected to a crankshaft 15*a* of the engine 15. Thus, a driving force of the engine 15 is transmitted to the center piece 31 through the damper mechanism 32. Torsional vibration from the engine 15 is absorbed by the damper mechanism 32, and no torsional vibration from the engine 15 is transmitted to the center piece 31.

The lock-up clutch 40, which is accommodated and disposed on the inner diameter side of the axially extending outer diameter portion 30*a* of the front cover 30, is a multi-plate clutch disposed adjacent to the turbine runner 20, and including a plurality of friction plates 41 and an actuator 45 for pressing the friction plates 41. This can improve the torque transfer capacity and the controllability of the lock-up clutch 40, and can reduce the amount of heat generation during engagement of the clutch. Each friction plate 41 is herein formed by a clutch disc 41*d* and a clutch plate 41*p*, and is located on the outer diameter side of the turbine runner 20 (a torus 35). This can increase the diameter of the lock-up clutch 40 to a relatively large value, and can ensure a necessary and sufficient torque transfer capacity. Note that two clutch discs 41*d* are provided in the present embodiment.

Moreover, the clutch discs 41*d* are engaged with splines of a hub 42, and the clutch plates 41*p* are engaged with splines of a drum 43. The actuator 45 is formed by a piston plate 46 that is brought into contact with, and is separated from the friction plates 41, a hydraulic chamber 47 to which a hydraulic pressure (a clutch engagement pressure) for moving the piston plate 46 is supplied, and a return spring 48 for returning the piston plate 46 (for releasing the clutch). Thus, since the lock-up clutch 40 has an independent actuator 45, the controllability of the lock-up clutch 40 is improved over conventional clutches that are operated by a differential pressure.

The hub 42, with which the clutch discs 41*d* are engaged, is also a part of a drum 53 of the engine power cut-off clutch 50. That is, the hub 42 of the lock-up clutch 40 is formed by the drum 53 of the engine power cut-off clutch 50. In other words, the hub 42 of the lock-up clutch 40 and the drum 53 of the engine power cut-off clutch 50 are formed by a single common part. This reduces the number of parts, and reduces the size of the clutches 40, 50.

On the other hand, the drum 43, with which the clutch plates 41*p* are engaged, has a connection portion 43*a* extending in the axial direction and connected to the outer contour of the turbine runner 20. The drum 43 is connected and fixed to the turbine runner 20 by the connection portion 43*a*. Thus, since a space on the outer diameter side of the torus 35 formed by the respective outer contours of the turbine runner 20 and the pump impeller 21 can be effectively used, the lock-up clutch 40 and the torus 35 can be disposed close to each other in the axial direction.

Moreover, the front side of the friction plates 41 is stopped by a snap ring 44 that is engaged with the drum 43, in order to prevent the friction plates 41 from coming off. On the other hand, the rear side of the friction plates 41 is in contact with the piston plate 46. Thus, the lock-up clutch 40 can be connected or released by moving the piston plate 46.

The piston plate 46 is movable in close contact with the drum 43 and the turbine hub 23. An inner diameter side end of the piston plate 46 is in close contact with an outer peripheral surface of a boss portion 23*a* of the turbine hub 23 through an oil seal 49*a*. Moreover, a bent portion 46*a*, which is bent in a U-shape so as to protrude forward, is formed substantially in the radial center of the piston plate 46. Moreover, an extended portion 23*b*, which extends forward at an outer peripheral end of the turbine hub 23, is in close contact with an outer peripheral surface of a rear-side recess of the bent portion 46*a* through an oil seal 49*b*. With this structure, the fluid-tight hydraulic chamber 47 is formed by the piston plate 46 and the turbine hub 23. Thus, since no special member is required to form the hydraulic chamber 47, the axial dimension of the lock-up clutch 40 can be reduced, and the number of components can be reduced.

The hydraulic chamber 47 formed as described above overlaps a part of the piston plate 46 in the axial direction. Thus, the actuator 45 can be formed by effectively using a space on the inner diameter side of the friction plates 41, whereby the lock-up clutch 40 can be reduced in size in the axial direction.

Moreover, the engine power cut-off clutch 50, which is accommodated and disposed on the inner diameter side of the intermediate portion 30*b* of the front cover 30, is formed with a smaller diameter than that of the lock-up clutch 40, and is disposed closer to the engine 15 than the lock-up clutch 40 is. Moreover, like the lock-up clutch 40, the engine power cut-off clutch 50 is also a multi-plate clutch having a plurality of friction plates 51, and an actuator 55 for pressing the friction plates 51. This can improve the torque transfer capacity and the controllability of the engine power cut-off clutch 50, and can reduce the amount of heat generation during engagement of the clutch. Each friction plate 51 is herein formed by a clutch disc 51d and a clutch plate 51p, and two clutch discs 51d are provided in the present embodiment.

Thus, by making the diameter of the engine power cut-off clutch 50 smaller than that of the lock-up clutch 40, both clutches 40, 50 can be disposed close to each other in the axial direction, while assuring a required capacity of the lock-up clutch 40 for which a larger transfer torque capacity is required than for the engine power cut-off clutch 50.

Moreover, the clutch discs 51d are engaged with splines of a hub 52, and the clutch plates 51p are engaged with splines of the drum 53. The actuator 55 is formed by a piston plate 56 that is brought into contact with, and is separated from the friction plates 51, a hydraulic chamber 57 to which a hydraulic pressure (a clutch engagement pressure) for moving the piston plate 56 is supplied, and a return spring 58 for returning the piston plate 56 (for releasing the clutch).

Moreover, the inner diameter side of the hub 52 with which the clutch discs 51d are engaged is fixed to an outer periphery of a rear end of the center piece 31. Thus, the hub 52 rotates together with the center piece 31. On the other hand, the drum 53, with which the clutch plates 51p are engaged, is fixed to the inner diameter portion 30c of the front cover 30, and the opposite end thereof is formed as the drum 43 of the lock-up clutch 40, as described above.

Moreover, the rear side of the friction plates 51 is stopped by a snap ring 54 that is engaged with the drum 53, in order to prevent the friction plates 51 from coming off. On the other hand, the front side of the friction plates 51 is in contact with the piston plate 56. Thus, the engine power cut-off clutch 50 can be connected or released by moving the piston plate 56.

The piston plate 56 is movable in close contact with the drum 53 and the front cover 30. An inner diameter side end of the piston plate 56 is in close contact with an outer peripheral surface of the boss portion 30d of the front cover 30 through an oil seal 59a. Moreover, a bent portion 56a, which is bent in a U-shape so as to protrude rearward, is formed substantially in the radial center of the piston plate 56. Moreover, an extended portion 30e, which is extended rearward in the inner diameter portion 30c of the front cover 30, is in close contact with an outer peripheral surface of a front-side recess of the bent portion 56a through an oil seal 59b. With this structure, the fluid-tight hydraulic chamber 57 is formed by the piston plate 56 and the front cover 30. Thus, since no special member is required to form the hydraulic chamber 57, the axial dimension of the engine power cut-off clutch 50 can be reduced, and the number of components can be reduced.

The hydraulic chamber 57 formed as described above overlaps a part of the piston plate 56 in the axial direction. Thus, the actuator 55 can be formed by effectively using a space on the inner diameter side of the friction plates 51, whereby the engine power cut-off clutch 50 can be reduced in size in the axial direction.

Moreover, the lock-up clutch 40 and the engine power cut-off clutch 50, which are structured as described above, are arranged so that the respective friction plates 41, 51 partially overlap each other in the axial direction. Such arrangement is possible because the engine power cut-off clutch 50 is formed with a smaller diameter than that of the lock-up clutch 40. Such arrangement of the clutches 40, 50 enables the clutches 40, 50 to be disposed close to each other in the axial direction.

Thus, the lock-up clutch 40 and the engine power cut-off clutch 50, both having a reduced axial dimension, can be disposed close to each other, and the lock-up clutch 40 can be disposed close to the torus 35. Therefore, even if the engine power cut-off clutch 50 is provided in the torque converter 13 having the lock-up clutch 40, an increase in size of the torque converter 13 can be suppressed.

Moreover, the motor-generator 14 has a stator 61 and a rotor 62, and the stator 61 and the rotor 62 are positioned on the outer diameter side of a part of the outer diameter portion 30a and the intermediate portion 30b of the front cover 30 so as to be substantially aligned with each other, that is, so as to axially overlap the engine power cut-off clutch 50 located on the inner diameter side thereof. Thus, since the torque converter 13 and the motor-generator 14 can be disposed close to each other in the axial direction, an increase in size of the drive device 10 in the axial direction can be reliably suppressed.

The stator 61 is herein formed by winding a coil 61b on a stator core 61a formed by stacked steel plates stacked in the axial direction, and is fixed to the motor housing 19. The rotor 62 is formed by arranging a multiplicity of stacked plates 62a, which are formed by permanent magnets, in the axial direction, and these stacked plates 62a are fixed and supported by a support plate 63.

This support plate 63 has a disc portion 63a extending in the radial direction in front of (on the engine 15 side of) the inner diameter portion 30c of the front cover 30 and in parallel with the inner diameter portion 30c, and a holding portion 63b for holding the stacked plates 62a. The holding portion 63b is connected to the disc portion 63a substantially in the axial center, and extends in the axial direction. Moreover, the rotor 62 and the stator 61 are provided so that the stacked plates 62a and the stator core 61a are arranged at the same position (an overlapping position) in the axial direction, that is, are aligned in the radial direction in a predetermined axial length, and the stacked plates 62a and the stator core 61a face each other with a slight gap therebetween.

Moreover, the motor housing 19 has a sidewall 19a along a front portion of the stator 61, and a resolver 64 is provided between an intermediate portion of the sidewall 19a and the rotor support plate 63. The resolver 64 is an element for accurately detecting the rotation position of the rotor 62 and controlling the timing of a current that is applied to the stator 61, and is formed by a rotor 64a and a stator 64b, each formed by a precisely processed stacked plates. The rotor 64a and the stator 64b are aligned in the radial direction (positioned so as to axially overlap each other) so that the stator 64b, which is excited by a coil, is located on the outer diameter side, and the rotor 64a is located on the inner diameter side.

Moreover, a ball bearing 65 is provided at an inner diameter end of the motor housing sidewall 19a. This ball bearing 65 is positioned on the inner diameter side of the resolver 64 so as to be substantially aligned with the resolver 64 in the radial direction (so as to axially overlap the resolver 64). A rotor hub 66, which is fixed to an inner diameter end of the rotor support plate 63, is fitted (not press-fitted) on the inner diameter side of the ball bearing 65 in an accurate tolerance state with almost no gap therebetween. Moreover, the inner diameter side of the hub 66 is spline-connected to the boss portion 30d of the front cover 30.

Operation of the above drive device 10 will be described below. When a driver depresses an accelerator pedal (with a low throttle opening) based on his/her intension to start the vehicle in the state where the vehicle is stopped and an ignition switch is ON, a current from a battery (not shown) first flows to the motor-generator 14, and the motor-generator 14 functions as a motor. The motor-generator 14, formed by a brushless DC motor, adjusts the timing of a current that is applied to the coil 61b of the stator 61 by a controller (not shown), based on accurate detection of the position of the rotor 62 by the resolver 64, and rotates the rotor 62 in a forward running direction with high efficiency. This rotation of the rotor 62 is transmitted, with a predetermined increase in torque ratio, to the input shaft 16 through the rotor support plate 63, the rotor hub 66, the front cover 30, and the torque converter 13 formed by the pump impeller 21, the turbine runner 20, and the stator 22.

Moreover, when the vehicle is at a relatively low predetermined speed right after starting, and the throttle is depressed to a certain opening or more, a fuel injection system is operated, and ignition is performed by a spark plug, whereby the motor-generator 14 functions as a starter motor to start the internal combustion engine 15. Thus, rotation of the crankshaft 15*a* of the internal combustion engine 15 is transmitted to the center piece 31 through the drive plate 33 and the damper mechanism 32. Moreover, the engine power cut-off clutch 50 is connected, and the driving force of the internal combustion engine 15 and the driving force of the motor-generator 14 functioning as a motor are combined and transmitted to the torque converter 13, and then shifted by the speed change mechanism 11 and transmitted to driving wheels at a desired rotational speed. Thus, when a large driving force is required, such as when the vehicle is in an accelerating state and a climbing state, the driving force of the motor-generator 14 assists the driving force of the internal combustion engine 15, running the vehicle with high horsepower.

Since the engine power cut-off clutch 50 is herein structured as a multi-plate clutch having the independent actuator 55, the engine power cut-off clutch 50 has a sufficient torque transfer capacity for the engine torque, enables reduction in the amount of heat generation during engagement of the clutch, and has excellent controllability. Thus, the driving force of the internal combustion engine 15 can be reliably transmitted to the input shaft 16, and the amount of heat generation can be reduced.

Moreover, when the vehicle is steadily running at a high speed, the motor-generator 14 is operated under no load (the motor output is controlled so as to cancel out the torque generated from a counter electromotive force generated by the motor), whereby the motor-generator 14 idles, and the vehicle runs only by the driving force of the internal combustion engine 15. Note that, depending on the state of charge (SOC) of the battery, the motor-generator 14 can function as a generator to regenerate energy. The lock-up clutch 40 is connected in a driving state by the internal combustion engine 15, or in a driving state where the internal combustion engine 15 is assisted by the motor (in some cases, in a driving state only by the motor). Thus, the torque transmitted to the front cover 30 is transmitted directly to the input shaft 16 through the hub 42 (the drum 53), the friction plates 41, the drum 43, the turbine runner 20, and the turbine hub 23 without using an oil flow of the torque converter.

At this time, as described above, since the lock-up clutch 40 is structured as a multi-plate clutch having a diameter equal to the outer diameter of the torus 35 and having the independent actuator 45, the lock-up clutch 40 has a sufficient torque capacity for the high horsepower by the motor assist, and has excellent controllability. Thus, the driving forces of the internal combustion engine 15 and the motor 14 can be reliably transmitted to the input shaft 16.

Moreover, when there is excess output from the internal combustion engine 15 because of steady low to medium speed running, downhill running, and the like, the motor-generator 14 functions as a generator to charge the battery according to the SOC of the battery. Especially when engine braking is requested during downhill running, the regenerated power of the motor-generator 14 functioning as a generator is increased, whereby a sufficient engine brake effect can be obtained. Moreover, when the driver depresses the brake pedal to request stopping of the vehicle, the regenerated power of the motor-generator 14 is further increased, and the motor-generator 14 operates as a regenerative brake, thereby regenerating the inertia energy of the vehicle as electric power, and decreasing energy dissipation by heat based on the friction brake. Moreover, in a medium speed range as well, the motor-generator 14 is rendered in a regenerating state so that the internal combustion engine 15 can be operated in a higher output and higher efficiency region, whereby the engine efficiency can be improved, and the motor running can be increased based on the regenerative charging of the battery, and thus, the energy efficiency can be improved.

Moreover, when the vehicle is stopped at a traffic light or the like, the motor-generator 14 is stopped, and the fuel injection system is turned OFF, whereby the internal combustion engine 15 is also stopped. That is, the idling state of conventional engines is eliminated. Moreover, when the vehicle is started from this stopped state, as described above, the vehicle is first started by the motor driving force of the motor-generator 14, and in a relatively low speed state right after the starting of the vehicle, the internal combustion engine 15 is started by the motor driving force. Assisting with the driving force of the motor 14 eliminates abrupt fluctuations in driving force of the internal combustion engine 15, thereby enabling smooth operation. Moreover, when engine braking is required or when braking is performed to stop the vehicle, the motor-generator 14 functions as a regenerative brake to regenerate vehicle inertia energy as electric energy. Moreover, the vehicle runs with the motor in a poor engine efficiency region such as regions of low engine load and very low engine load. By combination of these factors, hybrid vehicles having this drive device 10 can achieve low fuel consumption and reduction in exhaust gas.

As described in detail above, according to the drive device 10 of the present embodiment, the lock-up clutch 40 and the engine power cut-off clutch 50 are multi-plate clutches having the actuators 45, 55, respectively. This can improve the controllability and the transfer torque capacity of the lock-up clutch 40 and the engine power cut-off clutch 50, and can reduce the amount of heat generation during engagement of the clutches. Moreover, the friction plates 41 of the lock-up clutch 40 are disposed on the outer diameter side of the torus 35, and the engine power cut-off clutch 50 is formed with a smaller diameter than that of the lock-up clutch 40 and is provided in the torque converter 13. This enables the lock-up clutch 40 and the torus 35 to be disposed close to each other in the axial direction, and enables the lock-up clutch 40 and the engine power cut-off clutch 50 to be disposed close to each other in the axial direction. Thus, since the components in the torque converter 13 can be disposed close to each other in the axial direction, an increase in size of the torque converter 13, associated with disposing the engine power cut-off clutch 50 in the torque converter 13, can be suppressed.

Moreover, in the drive device 10, the motor-generator 14 is disposed so as to axially overlap the friction plates 51 of the engine power cut-off clutch 50 on the outer diameter side of the engine power cut-off clutch 50. Thus, since the torque converter 13 and the motor-generator 14 can be disposed close to each other in the axial direction, an increase in size of the drive device 10 in the axial direction can be reliably suppressed.

Figure 3:
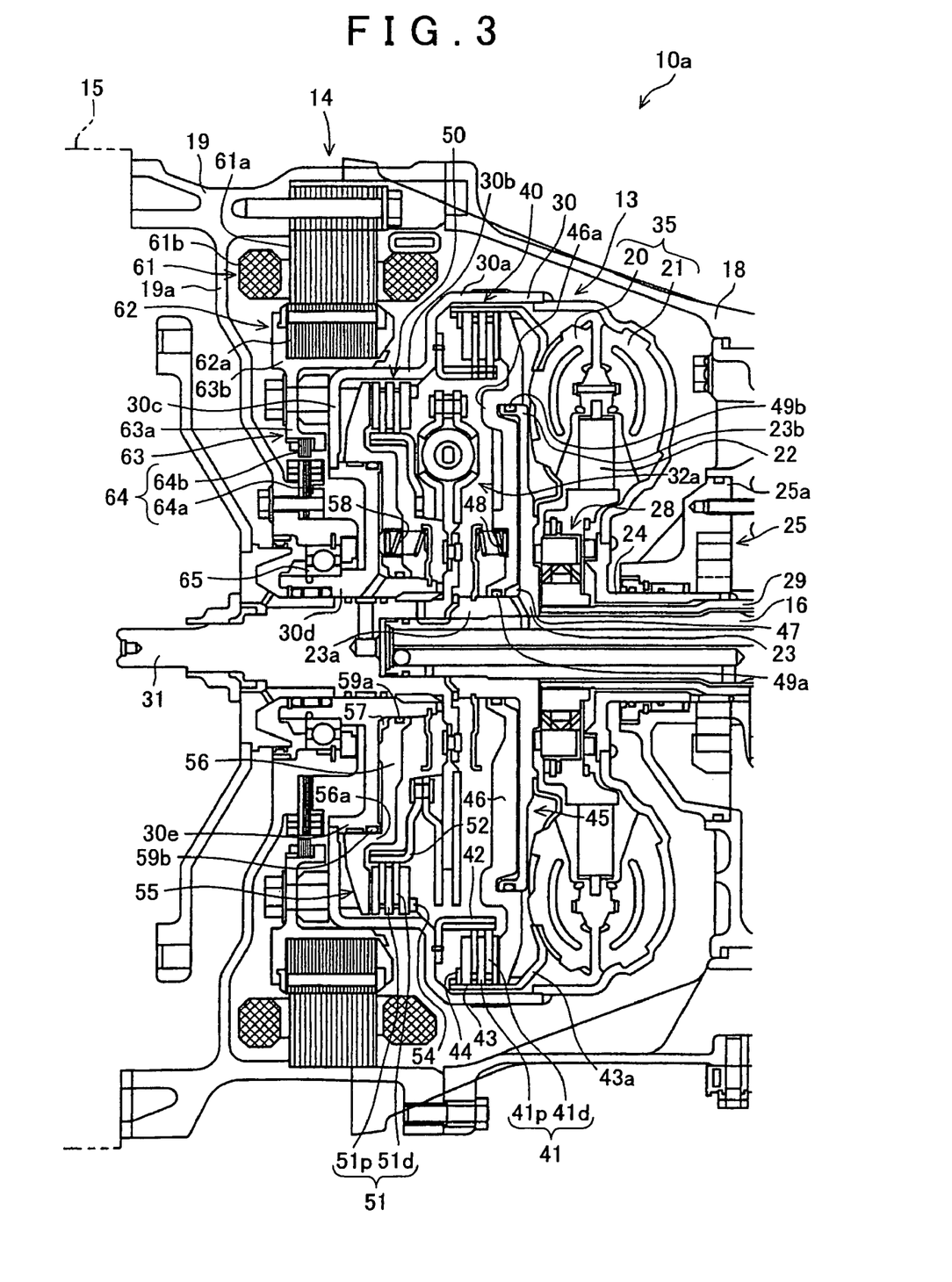
FIG. 3 is an enlarged cross-sectional view of a portion near a torque converter in a drive device according to a modification example.

Note that the above embodiment is shown by way of example only, and is not intended to limit the present invention at all, and it is to be understood that various improvements and modifications can be made without departing from the scope of the present invention. For example, the above embodiment has been described with respect to the case where the present invention is applied to the drive device in which the damper mechanism 32 is disposed outside the torque converter 13, more specifically, disposed between the internal combustion engine 15 and the torque converter 13. However, as shown in FIG. 3, the present invention may also be applied to a drive device 10a in which a damper mechanism 32a is disposed in the torque converter 13, more specifically, disposed between the lock-up clutch 40 and the engine power cut-off clutch 50. Disposing the damper mechanism in the torque converter 13 in this manner can improve durability of the damper mechanism.

Moreover, although the present invention is applied to FR type drive devices in the above embodiment, the present invention is not limited to this, and is applicable also to other types of drive devices, such as an FF (front engine, front drive) type. Moreover, although the above embodiment uses a brushless DC motor as a motor-generator, other motors, such as a DC motor and an induction type AC motor, may be used as the motor-generator. Moreover, although the above embodiment uses a torque converter as a fluid transmission device, a fluid coupling or the like may be used as the fluid transmission device.

What is claimed is:

1. A vehicle drive device, comprising:
   a speed change mechanism;
   a fluid transmission device provided closer to an engine attachment side than the speed change mechanism is and including a lock-up clutch;
   an electric motor having a rotor and a stator and connecting the rotor to an input portion of the fluid transmission device; and
   an engine power cut-off clutch that transmits or cuts off a driving force of an engine to or from the fluid transmission device, wherein:
   the lock-up clutch includes a plurality of friction plates and a hydraulic actuator that presses the friction plates, and is disposed closer to the engine attachment side than a torus is in the fluid transmission device, and the friction plates are disposed between an outer diameter portion of the torus and a front cover of the fluid transmission device;
   the engine power cut-off clutch includes a plurality of friction plates and a hydraulic actuator that presses the friction plates, is disposed closer to the engine attachment side than the torus is in the fluid transmission device, and is formed with a diameter smaller than an outer diameter of the lock-up clutch;
   the electric motor is disposed so as to axially overlap the engine power cut-off clutch friction plates on an outer diameter side of the engine power cut-off clutch;
   each of the lock-up clutch actuator and the engine power cut-off clutch actuator includes a piston that presses the friction plates, and a fluid-tight engagement pressure chamber to which an engagement pressure for operating the piston to engage the clutch is supplied;
   the engagement pressure chamber of the engine power cut-off clutch actuator is formed by the engine power cut-off clutch piston and the front cover; and
   the engagement pressure chamber of the lock-up clutch actuator is formed by the lock-up clutch piston and a turbine hub.

2. The vehicle drive device according to claim 1, further comprising:
   a lock-up clutch drum that holds the lock-up clutch friction plates, wherein
   the lock-up clutch drum is disposed so as to axially overlap a part of the torus on an outer diameter side of the torus.

3. The vehicle drive device according to claim 2, wherein the lock-up clutch drum includes a connection member that is connected to an outer contour of a turbine runner on the outer diameter side of the torus.

4. The vehicle drive device according to claim 3, wherein at least one of the lock-up clutch actuator and the engine power cut-off clutch actuator is disposed so that a part of the piston and the engagement pressure chamber axially overlap each other on an inner diameter side of the friction plates.

5. The vehicle drive device according to claim 1, wherein the lock-up clutch friction plates and the engine power cut-off clutch friction plates are disposed so as to axially overlap each other.

6. The vehicle drive device according to claim 5, wherein a lock-up clutch hub is formed by an engine power cut-off clutch clutch drum.

7. The vehicle drive device according to claim 1, wherein at least one of the lock-up clutch actuator and the engine power cut-off clutch actuator is disposed so that a part of the piston and the engagement pressure chamber axially overlap each other on an inner diameter side of the friction plates.

* * * * *